(12) United States Patent
Barthel et al.

(10) Patent No.: US 6,725,419 B1
(45) Date of Patent: Apr. 20, 2004

(54) AUTOMATION SYSTEM AND METHOD FOR OPERATING AN AUTOMATION SYSTEM

(75) Inventors: Herbert Barthel, Herzogenaurach (DE); Andreas Schenk, Erlangen (DE); Hartmut Schuetz, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 09/667,306

(22) Filed: Sep. 25, 2000

Related U.S. Application Data

(63) Continuation of application No. PCT/DE99/00696, filed on Mar. 12, 1999.

(30) Foreign Application Priority Data

Mar. 25, 1998 (DE) .......................................... 198 13 003

(51) Int. Cl.⁷ .......................... G06F 13/38; G06F 11/08
(52) U.S. Cl. ......................................... 714/807; 700/79
(58) Field of Search ............................. 714/807; 700/79

(56) References Cited

U.S. PATENT DOCUMENTS

| | | | | |
|---|---|---|---|---|
| 4,949,299 A | * | 8/1990 | Pickett | 710/105 |
| 5,535,199 A | * | 7/1996 | Amri et al. | 370/392 |
| 5,706,278 A | * | 1/1998 | Robillard et al. | 370/222 |
| 6,215,816 B1 | * | 4/2001 | Gillespie et al. | 375/219 |
| 6,505,247 B1 | * | 1/2003 | Steger et al. | 709/224 |

* cited by examiner

Primary Examiner—Stephen M. Baker
(74) Attorney, Agent, or Firm—Sughrue Mion, PLLC

(57) ABSTRACT

A method for operating an automation system and an associated automation system in which all the error-free information is exchanged cyclically with a safety protocol, whereby information losses can thereby be recognized. Data that do not change even in the course of multiple transmissions are transmitted only once.

18 Claims, 3 Drawing Sheets

AUTOMATION SYSTEM AND METHOD FOR OPERATING AN AUTOMATION SYSTEM

This is a Continuation of International Application PCT/DE99/00696, with an international filing date of Mar. 12, 1999, the disclosure of which is incorporated into this application by reference.

FIELD OF AND BACKGROUND OF THE INVENTION

The present invention relates to an automation system, and a method for operating an automation system. In particular, the invention relates to such a system and/or method in which a data transmission between the individual components of the automation system is made possible in each case by means of a telegram. The data transmission takes place between, for example, a central automation unit and a sensor and/or actuator for controlling and/or monitoring a technical process. The individual components of the automation system, e.g., the central automation unit and the sensor and/or actuator, are connected to one another communicatively via a bus.

Such a telegram usually has at least one destination identifier in order to identify the receiver of the telegram unambiguously, and usually also an origin identifier in order to identify the transmitter unambiguously. If telegrams are repeatedly exchanged cyclically between the transmitter and receiver at predefined or predefineable times, at least the destination identifier and the origin identifier remain constant. This is therefore a redundant section of the telegram, which has the effect of restricting the quantity of data that can be transmitted via the bus during a given time period.

OBJECTS OF THE INVENTION

One object of the present invention is consequently to provide an automation system and a method for operating an automation system in which the quantity of data that can be transmitted via the bus during a given time period is increased.

SUMMARY OF THE INVENTION

These and other objects are achieved with an automation system and a method for operating an automation system in accordance with the invention. According to one formulation of the invention, the automation system includes an automation unit, at least one transmitter and at least one receiver, which are connected to one another communicatively via a bus in such a way that a data transmission is performed in each case by means of a telegram. The transmitter is particular an input unit for connecting one or more external sensor systems and the receiver is in particular an output unit for connecting one or more external actuator systems. The telegram is output at predefined or predefineable times, preferably cyclically, and has a variable part and a constant part. According to the invention, the constant part is not transmitted along with the variable part if the constant part is known to the receiver.

If the constant part is known both to the transmitter and to the receiver, it is not necessary to transmit the constant part during a communications operation. The constant part can be specified to the transmitter or the receiver in any of several different ways. For instance, it is possible to specify the data of the constant part by means of a hardware setting, for example by using so-called coding switches to specify the constant part at the respective communications subscriber. On the other hand, there is of course also the possibility of specifying the data to the respective communications subscribers by means of software, i.e. by means of appropriate programming. This programming can be carried out by means of a programming device that is connected either directly to the communications subscriber or to the automation system as a whole.

Moreover, the constant part is known both to the transmitter and to the receiver at least in those circumstances when at least one communications operation with transmission both of the constant part and of the variable part has already taken place. Thus, it is possible to ensure, with a communications operation that has included both the constant part and the variable part, at least once that the constant part is known both to the transmitter and to the receiver.

Because the constant part is known both to the transmitter and to the receiver once the at least one communications operation transmitting both the constant part and of the variable part has taken place, it is no longer necessary to transmit the constant part during further communications operations in this case either.

In communications operations in which the transmission of the constant part is dispensed with, the length of the telegram is therefore shortened by the length of the constant part. The resulting smaller quantity of data during a communications operation relieves the bus and makes it possible to transmit a larger quantity of data via the bus during a given time period.

If a check signature is formed both by means of the constant part and by means of at least the user data in the variable part of the telegram, and the check signature is in fact transmitted in the variable part of the telegram during a data transmission, faulty alterations in either the variable part and/or in the non-transmitted constant part can be recognized and, if appropriate, suitably processed.

If at least one predefined or predefineable data item of the variable part is incremented or decremented, then the cyclically output telegrams can be distinguished unambiguously. Accordingly, the receiver can unambiguously detect the respective most recent telegram by comparing the predefined or predefineable data item of different telegrams. Additionally, when telegrams continue to be received with a respectively incremented or decremented data item, conclusions can be drawn regarding the intactness of the data transmission. The incrementing or decrementing can take place in a variety of ways, e.g. (a) by incrementing or decrementing either before, during or after each transmission operation or (b) as a function of time, i.e. in each case after a predefineable time period has elapsed, or (c) as a function of a data transmission which has taken place, in particular as a function of a data transmission which has taken place free of errors.

However, this predefined or predefineable data item, which is also referred to below as a so-called "sign of life", does not necessarily have to constitute a continuous sequence of natural numbers, because source processing and destination processing do not necessarily have to be synchronous. The receiver can therefore tolerate "gaps" to a limited degree. Moreover, it is possible to specify the size of the gaps so that an appropriate alarm reaction can be triggered if there is a gap that is greater than the maximum gap that is tolerable for the respective process.

In one advantageous refinement of the present invention, the life sign is not taken into account in the formation of the check signature. Advantageously, it thereby becomes possible to perform a rapid and reliable evaluation of the telegram (e.g. for alarm recognition) by simply comparing the received telegram with the previous telegram, including the check signature.

In the normal case, in which there is no alarm situation, the telegram is repeatedly identical with the previous telegram. An alarm is indicated only if there is a difference. The safety requirement is satisfied by the respective comparison of user data on the one hand and the check signature on the other. If the sign of life were also to be taken into account in the formation of the check signature, the check signatures of successive telegrams in connection with identical user data would differ only in terms of the sign of life which changes from telegram to telegram.

This gives rise to a variety of different strategies for evaluating the check signature. According to one alternative, only the check signatures of two successive telegrams are compared. In this case, when there are different check signatures, the evaluation indicates that the user data of the two successive telegrams differ. Given the presence of different check signatures, the user data would then be compared, and it would be determined in which particular user data a change has taken place. However, such a check strategy is sufficient only when there are comparatively low technical safety requirements.

In the event of relatively high technical safety requirements, when there are successive telegrams, a comparison is made in each instance both between the check signature of the present telegram and the check signature of the preceding telegram and between the complete user data set and the corresponding user data set of the preceding telegram. If the user data set changes, this is apparent both from the changed check signature and from the changed user data set.

In the case of a data transmission from the transmitter to the receiver, the transmitter forms a check signature regarding the user data before the new telegram is sent. This check signature is appended to the telegram and transmitted with it. At the receiver end, the receiver compares the check signature of the most recently received telegram with the check signature of the previously received telegram. The check signature of the most recently received telegram is identical to the check signature of the previously received telegram if the transmission has taken place free of errors and if there have been no changes to the user data since the last transmission. For this reason, the sign of life, which, as previously noted, changes from transmission to transmission, is therefore advantageously not included in the formation of the check signature.

When a new telegram is received, the receiver then compares the check signature of the most recently telegram with the check signature of the previously received telegram and compares the user data as a whole with the user data of the previously received telegram. In the event of differences, either in the check signature or the user data, the check signature is newly calculated and the comparison with the check signature of the previously received telegram is repeated. The same applies if there is a change in the user data but no change in the check signature. Only if both check signature and user data have changed in comparison with the preceding transmission does this qualify as a new status for the process, e.g., an alarm situation, to which the receiver must react appropriately.

If, on the other hand, there is a change either in the check signature or in the user data only, the check signature has to be newly calculated by the receiver and the comparison with the check signature of the preceding telegram has to be repeated. Depending on the result obtained, the receiver can, for example, request a new telegram if appropriate.

If at least one of the input units and/or at least one of the output units is designed respectively as a safety-related input unit or a safety-related output unit, the method described above for operating an automation system, or the automation system creates a safety-related component of the automation system, which comprises at least the safety-related input unit, the safety-related output unit and the data transmission which takes place between these components. The automation system is preferably designed in accordance with said method and is adapted to carry out the operations of such an automation system.

Further features, advantages and application possibilities for the present invention emerge from the subject matter of the dependent claims, from the following description of a preferred embodiment with reference to the drawing, and from the drawing itself. Here, all the features which are described and/or illustrated form, independently or in any desired combination, the subject-matter of the present invention, independently of the way they are combined in the patent claims and independently of the specific dependencies of the patent claims.

BRIEF DESCRIPTION OF THE DRAWINGS

The invention and advantageous refinements thereof are explained in more detail below with the aid of diagrammatic, exemplary embodiments in the drawing, in which.

DETAILED DESCRIPTION OF THE PREFERRED EMBODIMENTS

Figure 1:
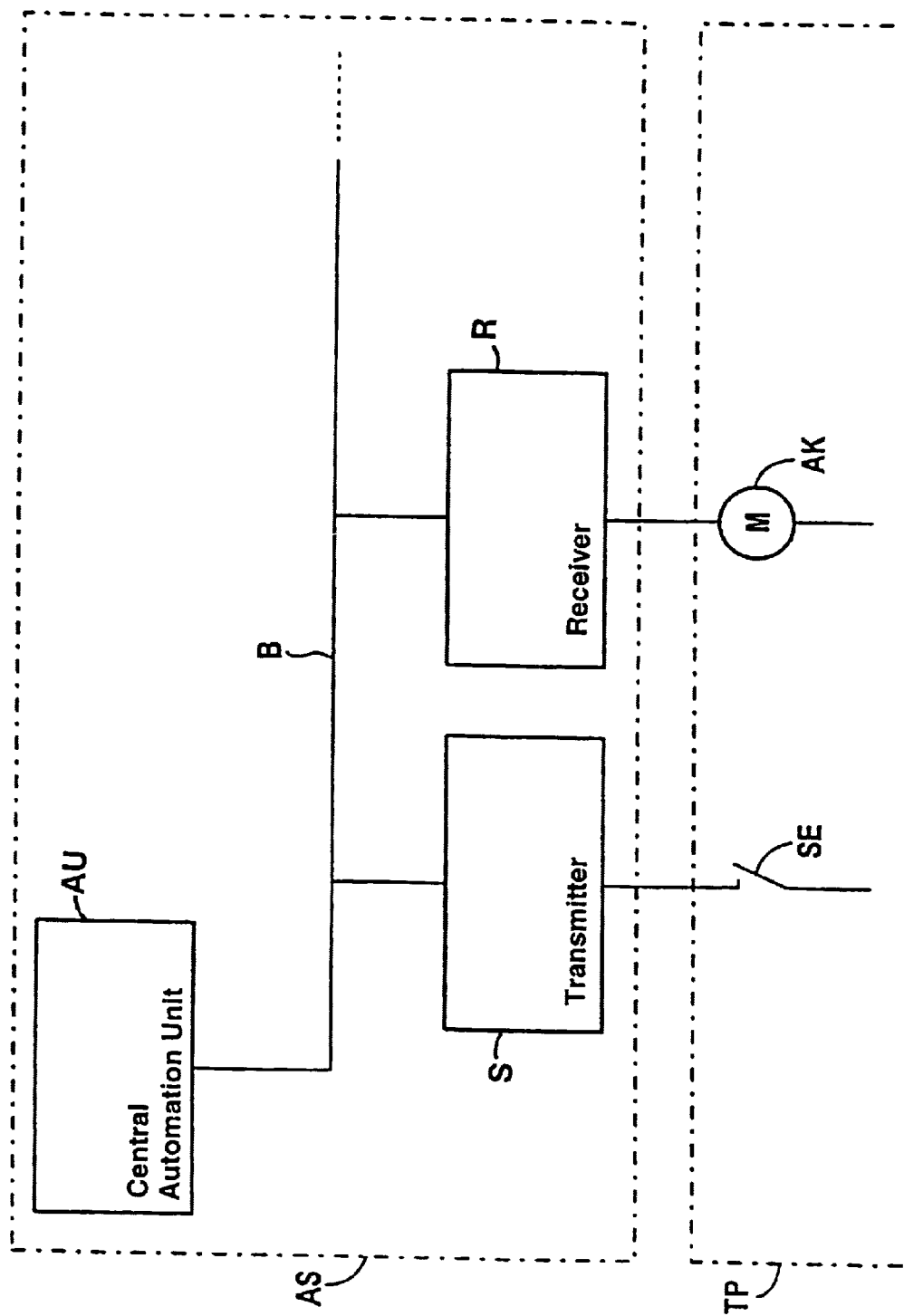
FIG. 1 shows a schematic illustration of an automation system according to a preferred embodiment of the invention.

According to FIG. 1, the automation system AS, which is provided for controlling and/or monitoring a technical process TP includes, for example, a central and/or superordinate automation unit AU and at least one transmitter (sender) S and a receiver R which are connected communicatively to one another via a bus B. The transmitter is, for example, an input unit S for connection to an external sensor system SE, a switch SE being represented by way of example as an external sensor SE in this described embodiment. The receiver R is, for example, an output unit for connection to an external actuator system AK, a motor AK being represented as an external actuator AK in this described embodiment. Of course, other sensors may be connected to the transmitter S, for example limiting value sensors, filling level monitors and/or sensors that supply analog values, e.g., travel measuring devices, etc. Correspondingly, further actuators, for example solenoid valves, lights, hydraulic assemblies, which may be actuated either in an analog or digital fashion depending on their design, may be connected to the receiver R.

Further transmitters S and/or receivers R may be connected to the bus B of the automation system AS, as is generally indicated in the preferred embodiment according to FIG. 1.

The data transmission from the transmitter S to the receiver R is carried out via the bus B by means of a telegram T. The telegram T, on the one hand, satisfies the bus protocol prescribed for the bus B. In addition, the telegram has the characteristics described below, having the advantages that are brought about in conjunction with the present invention.

Figure 2:
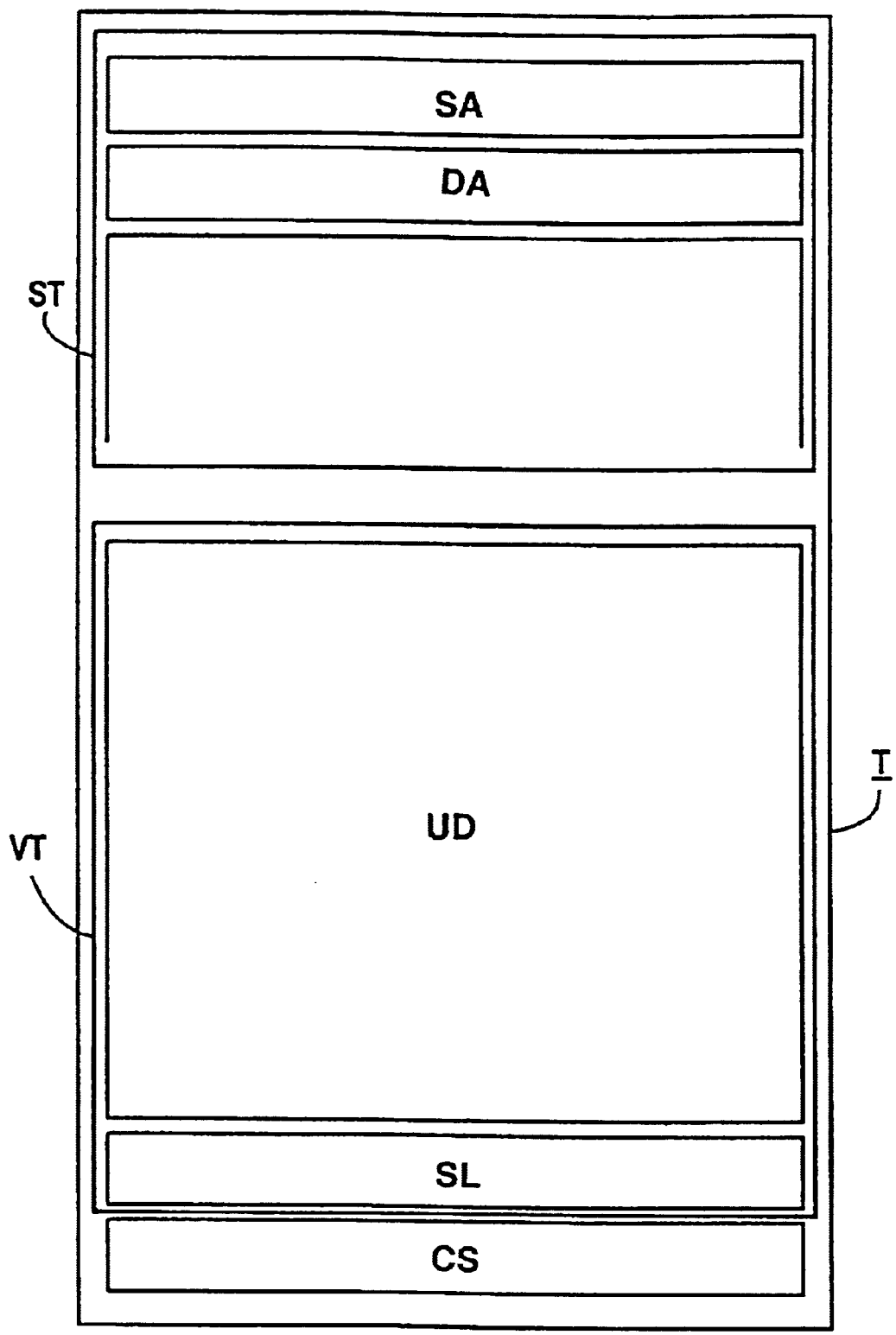
FIG. 2 shows a schematic layout of a telegram.

As illustrated in FIG. 2, the telegram T has a variable part VT and a static, i.e. constant part ST. The constant part ST has at least one source address SA and one destination address DA, whereby it is possible to reference the transmitting station S with the source address SA, and to reference the receiver R with the destination address DA.

The variable part VT comprises at least the user data UD and in addition a check signature CS. The check signature is implemented in the simplest case e.g. as parity information, but is advantageously implemented as e.g. a block protection (cyclic redundancy check, CRC), which recognizes block errors, which are errors within the entire telegram T, with a high degree of reliability. Here, a particular feature lies in the fact that this check signature CS is formed both by means of the constant part ST and by means of the variable part VT of the telegram T.

Depending on the field of use and the standard which is employed along with it, the safety measure which is achieved with the check signature CS could be modified by virtue of the fact that, when a CRC is used as the check signature CS, the CRC length is modified. In specific applications, e.g., a 32-bit CRC is necessary; for other applications an 8-bit CRC could be sufficient.

Furthermore, in the preferred embodiment according to FIG. 2, the telegram T has a data item SL in the variable part VT that is either incremented or decremented before, during or after each data transmission operation. The data item SL is evaluated by the receiver R of the telegram T and gives an indication as to whether the communications relationship is intact. If, in fact, the value of the data item SL remains unchanged during a predefined or predefineable time period, the receiver R is aware of the fact that either the transmitter S has failed and is not supplying any new, more recent telegrams T, or that the communications link between the transmitter S and the receiver R is broken, so that new, more recent telegrams T can no longer reach the receiver R.

While the telegram T is output at predefined or predefineable times, in particular cyclically, and is thus transmitted, for example, every 5 ms, the above-mentioned predefined or predefineable time must be selected to be at least longer than the cycle time with which the telegrams T are output. If a new, more recent telegram T with a changed content of the data item SL is still not present at the receiver R after a predefined or predefineable time of, for example, 8 ms, this is evaluated by the receiver R as an error situation, so that the receiver R can initiate the necessary safety-related operational reactions.

On the other hand, the time within which the safety reaction has to be triggered when an intact telegram T fails to occur has an upper limit associated with the process. The upper limit is oriented according to an error tolerance time of the respective process.

On the other hand, in the case of cyclical processing of the entire bus transfer, the security time inclusive of the CPU cycle time must be capable of being realized within the cycle time of the super-ordinate automation unit AU.

With every new valid telegram T that is received correctly by the receiver R, the monitoring time is restarted so that, depending on the selection of the security time period, one or more telegrams T with errors are tolerable.

An error situation is also present if the propagation time of the respective telegrams, i.e. the time between dispatch by the transmitter and reception by the receiver, exceeds a predefined or predefineable maximum propagation time.

In order to detect such an error situation, provision is made to output a telegram with a data item SL, which is designated below as a sign of life SL. The receiver R, which is, e.g., a safety-related sensor or a safety-related actuator, copies the life sign SL that was received with the telegram T into the user data area UD of a response telegram T, and forwards this response telegram T back to the original transmitter S.

The original transmitter S ascertains the time difference between the time when the response telegram T is received and the time the original transmission was sent. As a result, it is possible to obtain an unequivocal correlation on the basis of the sign of life SL of the original telegram T and an identical data item in the user data UD of the response telegram T.

In view of the fact that, at maximum, approximately ⅔ of the total propagation time, i.e. the propagation time of the telegram T from the original transmitter S to the receiver R and back to the original transmitter S, may be used up for the transmission from the transmitter S to the receiver R, the tolerable maximum propagation time turns out to be approximately ⅔ of the ascertained time difference.

If a new telegram T, to be recognized from its incremented or decremented sign of life, is not present after the tolerable maximum propagation time has elapsed, this situation is evaluated as an error situation.

In the illustration according to FIG. 2, only the telegram T is illustrated. The bus protocol data, which, in accordance with the bus protocol provided for the bus system B, are transmitted either before and/or after the telegram T, are not illustrated.

Figure 3:
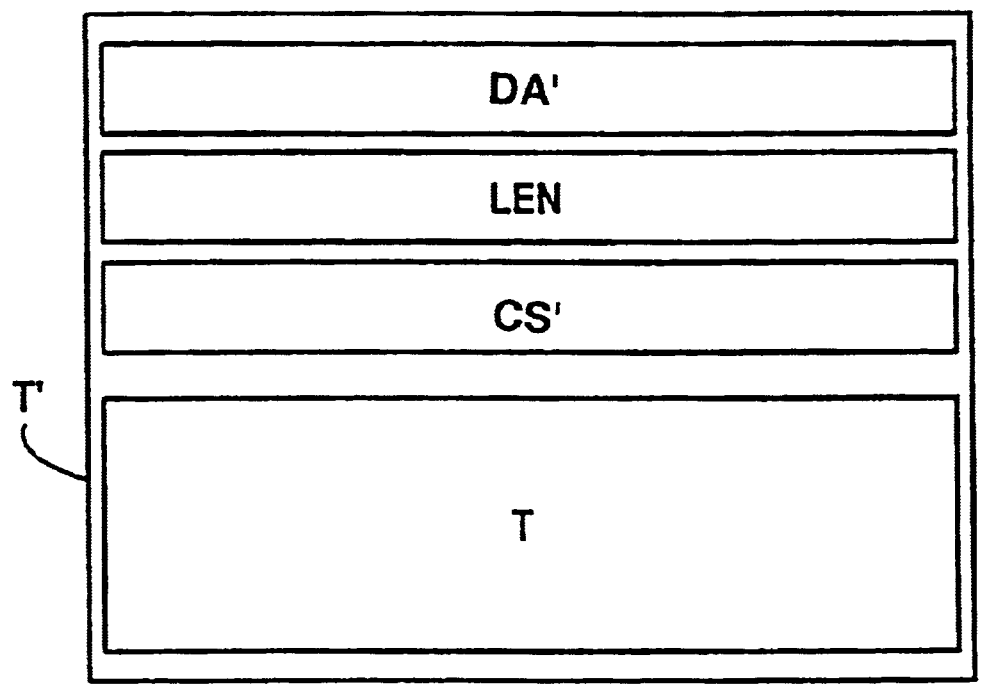
FIG. 3 shows a schematic layout of a telegram which satisfies the transmission protocol defined for the transmission medium.

These data, insofar as they are relevant in the context of the present invention, are schematically illustrated in FIG. 3. In FIG. 3, the telegram T according to FIG. 2 is illustrated as block T.

According to FIG. 3, the telegram T' comprises not only the telegram T, which represents, as it were, the user data of the telegram T', but also a destination address DA', a length identifier LEN and a check signature CS'.

The data item DA' defines the destination address and thus the receiver of the telegram T'. This is important in particular if the constant part ST of the telegram T is not transmitted, and thus there is no longer a destination identifier contained in the telegram T itself. By virtue of the destination address DA' of the telegram T, it is nonetheless still possible to transmit the telegram T' to the respective receiver.

In the exemplary embodiment, the transmission method is used e.g. on a profibus, the destination address DA' then being a destination address which is encoded as an unambiguous subscriber address on the bus.

In contrast to this, the destination address DA according to FIG. 2 is an unambiguous, yet possibly random identifier that has previously been agreed to with all the relevant safety-related communications subscribers and that is also known to each of them. Each safety-related communications subscriber is therefore assigned an unambiguous identifier, which is used as a source or a destination address during the communications operations between the safety-related communications subscribers. This unambiguous identifier is also employed to monitor the communications operations in case a comparison becomes necessary.

In addition, a length identifier LEN, which specifies the overall length of the telegram T transmitted at any given moment, is transmitted. A check signature CS' is also formed covering the entire telegram T' for the bus protocol defined for the transmission medium.

Without limiting the invention, the present invention can be summed up as follows:

A method for operating an automation system and an automation system are disclosed in which all the safety-related information is exchanged, preferably cyclically, with a safety protocol, allowing information losses to be thereby detected. Data that remain unchanged even through multiple transmissions are transmitted only once.

In addition, the receiver is thus in a position to monitor the transmitter from a safety standpoint, since the receiver continuously waits for the arrival of new messages. When new messages, which can always be recognized as such by reference to their sign of life, fail to occur within a predefinable tolerance time, the receiver evaluates this as an error situation.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claim is:

1. Method for operating an automation system comprising an automation unit, at least one transmitter as an input unit connecting to at least one external sensor system, at least one receiver as an output unit connecting to at least one external actuator system, and a bus communicatively connecting the automation unit, the transmitter and the receiver; said method comprising:

transmitting data via said bus by means of a telegram, said telegram having a variable part and a constant part;

outputting the telegram at predefined or predefineable times; and transmitting the variable part without the constant part if the constant part is known both to the transmitter and to the receiver.

2. Method according to claim 1, wherein the telegram is output cyclically.

3. Method according to claim 1, wherein the constant part is known if at least one previous communications operation transmitting both the constant part and the variable part has taken place.

4. Method according to claim 1, wherein the variable part comprises user data; said method further comprising:

forming a check signature at least for the user data of the variable part of the telegram; and transmitting the check signature in the variable part of the telegram.

5. Method according to claim 4, further comprising:

forming a further check signature for the constant part of the telegram.

6. Method according to claim 1, wherein the variable part comprises at least one predefined or predefineable data item, said method further comprising:

incrementing or decrementing the data item before, during or after each data transmission operation.

7. Method according to claim 1, wherein the variable part comprises at least one predefined or predefineable data item, said method further comprising:

incrementing or decrementing the data item as a function of time.

8. Method according to claim 1, wherein the variable part comprises at least one predefined or predefineable data item, said method further comprising:

incrementing or decrementing the data item as a function of a data transmission that has taken place free of errors.

9. Method according to claim 1, wherein:

the transmitter is a safety input unit; and the receiver is a safety output unit.

10. Automation system, comprising:

an automation unit;

at least one transmitter configured as an input unit connecting to at least one external sensor system;

at least one receiver configured as an output unit connecting to at least one external actuator system; and a bus communicatively connecting said automation unit, said transmitter and said receiver;

wherein:

a data transmission via said bus is performed by means of a telegram;

the telegram is output at predefined or predefineable times;

the telegram has a variable part and a constant part; and the constant part is not transmitted together with the variable part if the constant part is known both to said transmitter and to said receiver.

11. Automation system according to claim 10, wherein the telegram is output cyclically.

12. Automation system according to claim 10, wherein the constant part is known if at least one previous communications operation transmitting both the constant part and the variable part has taken place.

13. Automation system according to claim 10, wherein:

the variable part comprises user data;

a check signature is formed at least by means of the user data of the variable part of the telegram; and the check signature is transmitted in the variable part of the telegram during the data transmission.

14. Automation system according to claim 13, wherein a further check signature is formed by means of the constant part of the telegram.

15. Automation system according to claim 10, wherein:

the variable part comprises at least one predefined or predefineable data item; and the data item is incremented or decremented before, during or after each data transmission operation.

16. Automation system according to claim 10, wherein:

the variable part comprises at least one predefined or predefineable data item; and the data item is incremented or decremented as a function of time.

17. Automation system according to claim 10, wherein:

the variable part comprises at least one predefined or predefineable data item; and the data item is incremented or decremented as a function of a data transmission that has taken place free of errors.

18. Automation system according to claim 10, wherein:

said transmitter is configured as a security input unit connecting to at least one external security sensor system; and said receiver is configured as a security output unit connecting to at least one external security sensor system.

* * * * *